United States Patent
Williams et al.

Patent Number: 5,099,704
Date of Patent: Mar. 31, 1992

[54] TRANSFER CASE POWER TAKE-OFF APPARATUS

[75] Inventors: Randolph C. Williams, Weedsport; Robert J. Wilson, Warners, both of N.Y.

[73] Assignee: New Venture Gear, Inc., Troy, Mich.

[21] Appl. No.: 687,837

[22] Filed: Apr. 19, 1991

[51] Int. Cl.⁵ .................................. F16H 37/06
[52] U.S. Cl. ............................ 74/15.88; 74/15.84; 74/15.4; 475/346; 475/335
[58] Field of Search ............... 475/296, 331, 335, 346; 74/15.4, 15.88, 15.84

[56] References Cited

U.S. PATENT DOCUMENTS

| | | | |
|---|---|---|---|
| 809,338 | 1/1906 | Symmonds, Jr. | 475/296 |
| 1,901,194 | 3/1933 | Salerni | 475/335 X |
| 1,903,013 | 3/1933 | Salerni | 475/335 X |
| 2,062,195 | 11/1936 | Smith | 74/15.88 X |
| 4,092,878 | 6/1978 | Campbell | 475/346 X |
| 4,604,908 | 8/1986 | Dolan | 74/15.88 |
| 4,813,290 | 3/1989 | Hone | 74/15.88 |
| 4,862,755 | 9/1989 | Eastman | 74/15.88 |

Primary Examiner—Leslie A. Braun
Assistant Examiner—Matthew Stavish
Attorney, Agent, or Firm—Harness, Dickey & Pierce

[57] ABSTRACT

An improved power take-off arrangement for a transfer case which is readily incorporated into a planetary gear reduction assembly without necessitating excessive redesign of the transfer case. The power take-off arrangement includes utilization of a bearing support member for eliminating excessive eccentric loading during power take-off operation while providing improved centering and piloting capabilities.

19 Claims, 2 Drawing Sheets

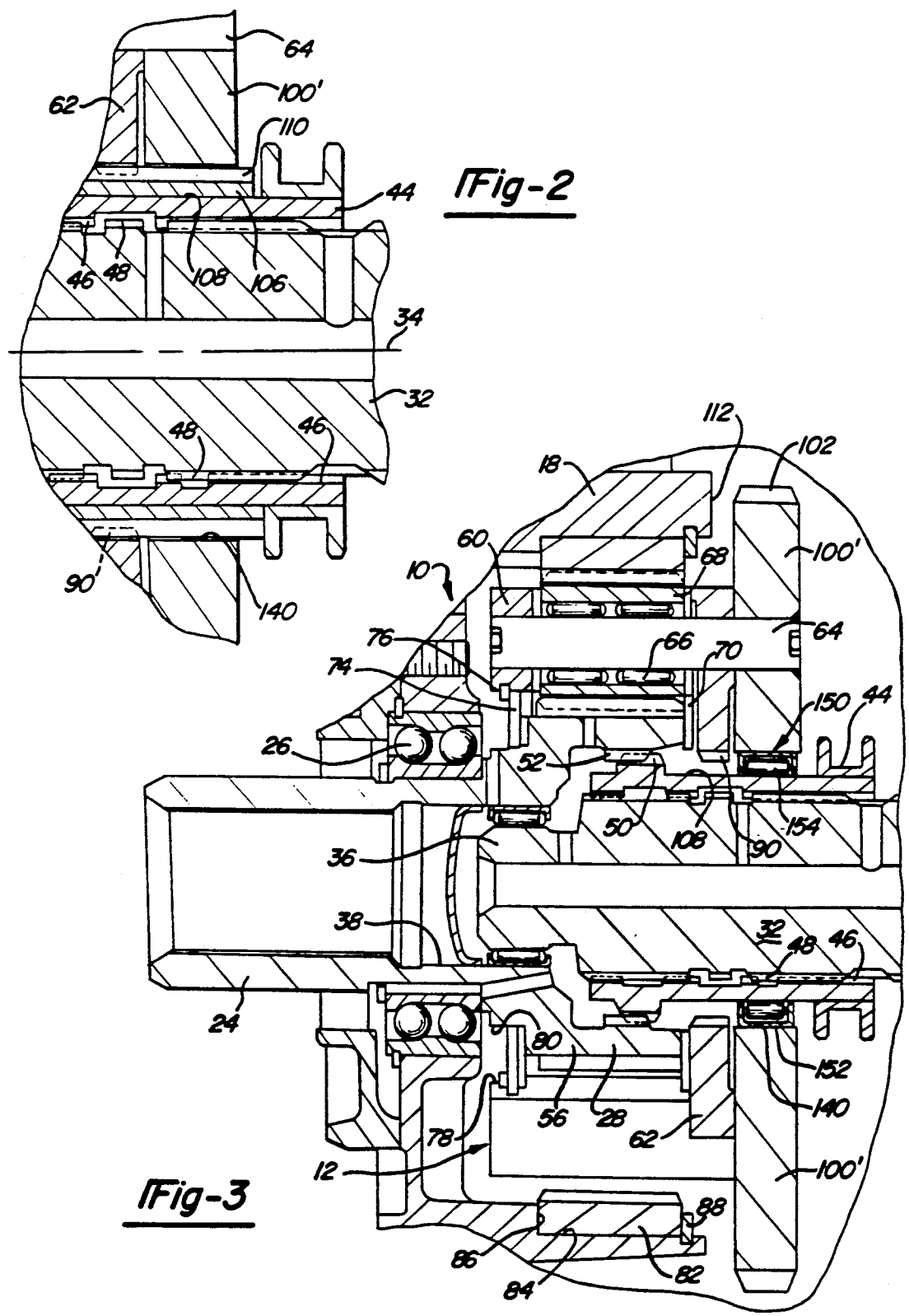

TRANSFER CASE POWER TAKE-OFF APPARATUS

BACKGROUND OF THE INVENTION

The present invention relates to a transfer case for four wheel drive vehicles and, more particularly, to a power take-off arrangement for a planetary gear reduction assembly supported within the transfer case.

It is a desirable option to provide a power take-off arrangement for a transfer case which is readily accessable and compact. Conventionally, it had been the practice to mount a separate power take-off gear on the input shaft of the transfer case for delivering torque from the input shaft to a power take-off gearbox. However, such arrangements typically require extensive redesign of the existing transfer case including extending the input shaft and transfer case housing to accommodate the power take-off gear. Unfortunately, space limitations generally make such design adjustments impractical or financially prohibitive.

As disclosed in U.S. Pat. No. 4,604,908 issued Aug. 12, 1986 to Dolan and commonly assigned to the present assignee of the instant application, a power take-off arrangement is provided in association with a planetary gear reduction assembly. In general, the power take-off gearbox is driven by the planetary gear assembly at a reduced speed relative to the input shaft. More specifically, the transfer case housing supports an annulus gear and the input shaft which terminates in an axial flange portion defining an integral sun gear. A rotatably carrier assembly supports a plurality of planet gears and includes an inboard carrier ring having peripheral gear teeth adapted to mesh with an input gear of the power take-off gearbox. While the power take-off arrangement disclosed in U.S. Pat. No. 4,604,908 performs satisfactory, by virtue of its construction the loading imposed by the power take-off input gear on the input carrier ring caused eccentric loading to be transferred to the planetary gear reduction assembly. As such, a bending moment is exerted on the planetary gear reduction assembly which may result in excessive gear wear, binding, and/or overstressed conditions during operation of the transfer case in its power take-off mode.

SUMMARY OF THE INVENTION

It is an object of the present invention to provide an improved power take-off arrangement for a transfer case which is readily incorporated into a planetary gear reduction assembly without necessitating excessive redesign of the transfer case. The power take-off arrangement of the present invention includes utilization of bearing support means for eliminating excessive eccentric loading during power take-off operation while providing improved centering and piloting capabilities.

It is another object of this invention to provide a transfer case of the type which uses the rotatable carrier assembly of the planetary gear reduction assembly to drive the power take-off output gear. This arrangement advantageously utilizes the continuously rotated planetary carrier assembly for driving the power take-off output gear when the transfer case is operating in any of its various driving modes.

Accordingly, the improved power take-off arrangement of the present invention includes a separate power take-off output gear fixedly supported for rotation with the carrier assembly of the helical planetary gear reduction assembly. Support bearing means are concentrically interposed between a shiftable clutch collar and the central bore of the take-off output gear. The bearing support means journally supports the power take-off output gear for rotation about a central longitudinal axis. This arrangement inhibits excessive unbalanced radial loading on the carrier assembly for obviating excessive gear wear when drive torque is transfer to the power take-off gearbox.

The transfer case clutch collar may be shifted in one direction from a neutral position into a "high" or direct drive range position wherein it interconnects the input shaft sun gear directly to the central output shaft. Upon returning the clutch collar to its neutral position, the input shaft sun gear is uncoupled from the central output shaft. Shifting of the clutch collar in the opposite direction from the neutral position defines a "low" drive range position wherein the clutch collar external splines engage internal splines formed on the central bore of the inboard carrier ring. Thus, with the clutch collar in any of its three positions, (i.e. high, neutral or low) a power take-off mode may be achieved by placing the input gear associated with the power take-off gearbox unit in driving engagement with the power take-off output gear. As a result, power at a predetermined constant relative speed is transferred from the input shaft sun gear to the helical planetary gear reduction assembly and, in turn, to the power take-off output gear.

Other objects, features, and advantages of the present invention will be readily apparent from a thorough study of the following detailed description taken in conjunction with the accompanying drawings and appended claims.

BRIEF DESCRIPTION OF THE DRAWINGS

FIG. 2 is a partial cross-sectional view of a power take-off arrangement incorporated with the planetary gear reduction assembly of FIG. 1 in accordance with a second preferred embodiment of the present invention; and FIG. 3 is a fragmentary cross-sectional view, similar to FIG. 1, illustrating a power take-off arrangement according to a third preferred embodiment of the present invention.

DESCRIPTION OF THE PREFERRED EMBODIMENT

Figure 1:
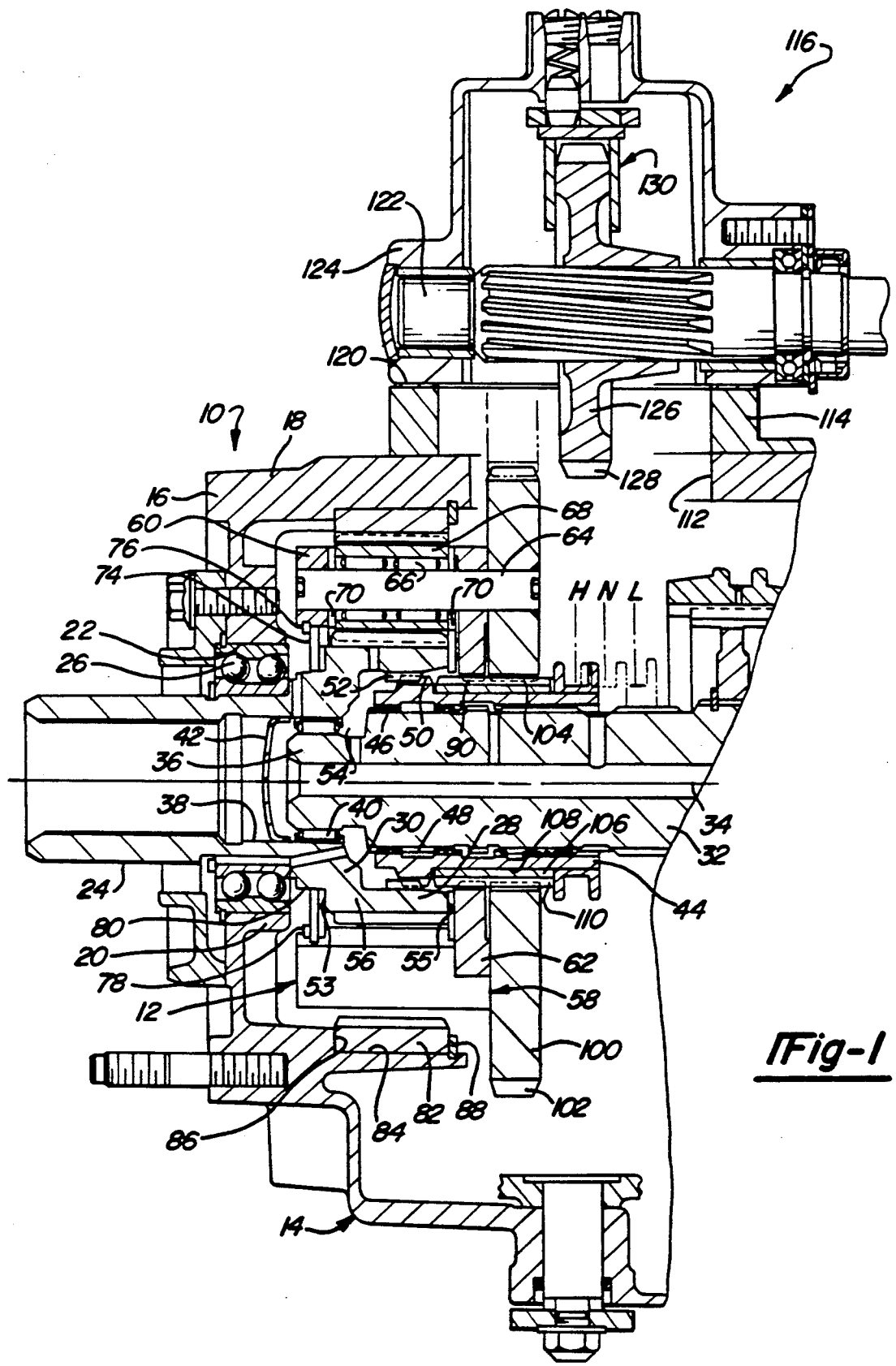
FIG. 1 is a fragmentary cross-sectional view a portion of an exemplary transfer case incorporating a power take-off arrangement with a planetary gear reduction assembly according to a first preferred embodiment of the present invention.

Referring now to the drawings, a portion of an exemplary transfer case 10 incorporating a helical planetary gear reduction assembly 12 is shown. Vehicle transfer case 10 and helical planetary gear reduction assembly 12 are thoroughly disclosed in U.S. Pat. No. 4,677,873 to Eastman, commonly assigned to the assignee of the instant application, the disclosure of which is incorporated by reference herein. However, it will be appreciated that the various power take-off arrangements described hereinafter are readily adapted for utilization with any full-time, part-time, synchronized or non-synchronized transfer case incorporating a planetary gear reduction assembly therein.

With reference to FIG. 1, a transfer case housing 14 includes an end wall 16 with a side wall 18 extending therefrom in one axial direction. End wall 16 has an annular hub portion 20 formed therein having an axial bore 22 journally supporting an input shaft 24 therein by a bearing assembly 26. Input shaft 24 terminates in an outwardly stepped axially extending flange portion 28 joined by an intermediate stepped radially extending flange portion 30 to input shaft 24. An output shaft 32 is aligned on a central longitudinal axis 34 of input shaft 24 and has a piloted end 36 received in an input shaft bore 38 by needle bearings 40. An end plug 42 closes shaft bore 38. Output shaft 32 has a clutch collar 44 axially slidable thereon by means of collar internal splines 46 engaged with output shaft external splines 48.

Clutch collar 44 has external clutch teeth 50 shown slidably engaged with internal clutch teeth 52 in an axial counter-bore 54 formed in flange portion 28 of input shaft 24. Torque is transferred directly from input shaft 24 to output shaft 32 via engagement of clutch teeth 50 and 52 and collar internal splines 46 with output shaft external splines 48 for establishing a direct high-range drive mode "H".

With continued reference to FIG. 1, input shaft axial flange portion 28 is shown to define an integral helical sun gear 56 of planetary gear reduction assembly 12. More particularly, sun gear 56 defines oppositely facing radially extending annular shoulders 53 and 55. Planetary gear reduction assembly 12 includes a carrier assembly 58 having first outboard and second inboard carrier ring members 60 and 62, respectively. The axially spaced ring members are fixedly joined by a plurality of circumferentially spaced pins that form axially extending pinion shafts 64. Journalled on needle bearing 66 for rotation on shafts 60 are a plurality of helical planet or pinion gears 68. Thrust washers 70 are provided on shafts 64 intermediate pinion gears 68 and each of carrier ring members 60 and 62 for axially aligning pinion gears 68. Thrust washers 70 contact the respective inner surfaces of carrier rings 60 and 62 and transverse shoulders 53 and 55, respectively, to axially locate and align carrier assembly 58. A locking ring 74 and snap retainer 76 are disposed between an interior bearing surface 78 formed on carrier outboard ring 60 and exterior bearing surface 80 formed on radial flange portion 30. Thus, rotatable movement of first carrier ring 60 relative to input shaft bearing surface 80 inhibits axial and excessive radial movement of pinion gears 68 for optimum tooth bearing engagement with annulus gear 82 and sun gear 56.

Helical annulus gear 82 is mounted via a splined press-fit on an inner surface of housing cylindrical side wall 18. In the embodiments shown, side wall 18 includes a stepped counterbore 84 which receives and axially seats in a press-fit manner annulus gear 82 against its stop shoulder 86. Annulus gear 82 is additionally retained against inward axial movement away from shoulder 86 in the disclosed form by means of a retaining ring 88 fixed to housing 16 by machine screws (not shown). Alternatively, it is contemplated that in another form, a snap-ring could be used to insure positive retention of annulus gear 82 against axial thrust loads.

Second carrier ring 62 includes internal spur gear teeth 90 formed thereon which may be placed in sliding meshing engagement with clutch collar external teeth 50 when clutch collar 44 is moved axially to the right into the low range mode position "L" indicated in dashed lines.

In accordance with the first preferred embodiment of the present invention, a power take-off output gear 100 is fixably secured (i.e. welded) to an outer surface of inboard carrier ring 62. In addition, pinion shafts 64 extend through and are fixed to take-off output gear 100. Power take-off output gear 100 has spur gear teeth 102 formed at its outer periphery and internal gear teeth 104 formed on its central bore which are generally alignable with internal gear teeth 90 of second carrier ring 62. Support bearing means are provided for concentrically supporting power take-off output gear 100 for rotation about central axis 34 while inhibiting any excessive bending moment from being exerted on planetary gear reduction assembly 12 upon transfer case 10 being operated in its power take-off mode.

The bearing support means is shown to include an elongated sleeve bearing 106 concentrically and journally supported on an exterior cylindrical surface 108 of clutch collar 44. Elongated sleeve bearing 106 includes external spline teeth 110 alignable with clutch collar external clutch teeth 50 and which are adapted to be maintained in constant meshed engagement with both internal spur gear teeth 90 of second inboard carrier ring 62 and internal gear teeth 104 of power take-off output gear 100. As such, take-off output gear 100 is rotatably driven when the constantly rotated planetary carrier assembly 58 when clutch collar 44 is selectively shifted to any of its high "H", neutral "N" and low "L" range positions.

As best seen in FIG. 1, a portion of housing side wall 18, located in close proximity to output gear 100, is adapted to be removed for providing a rectangular access opening or aperture 112 which is aligned radially outwardly from take-off output gear external gear teeth 102. Aperture 112 is defined by a suitable mounting structure such as peripheral rectangular frame 114.

An exemplary and conventional power take-off gearbox unit 116 is adapted to be securely mounted on frame structure 114 such as by a plurality of bolts (not shown). Seal means 120 are provided between frame 114 and gearbox unit 116 for providing a fluid-tight seal therebetween. Gearbox unit 116 includes a longitudinally extending take-off shaft 122 journalled in casing 124 and which is positioned parallel with transfer case input shaft 24 and output shaft 32. Take-off shaft 122 has a power take-off input gear 126 which is splined thereto for axial sliding movement thereon and rotation therewith. Input gear 126 is sized such that its gear teeth 128 extend radially through aperture 112 and are positioned to slidably mesh with output gear teeth 102. Thus, input gear 126 is selectively shifted axially on shaft 122 between the right "disengaged" position shown for driven engagement with output gear teeth 102, and the left "engaged" position (shown in dashed lines) by a fork mechanism 130.

With reference now to FIG. 2, a second preferred embodiment of a power take-off arrangement is shown which is adapted for incorporation with helical planetary gear reduction assembly 12. In general, this arrangement is substantially identical to that shown in FIG. 1 with the exception that internal gear teeth 104 formed on power take-off output gear 100 are removed such that the major diameter surface of sleeve bearing external spline teeth 110 supports a non-splined surface 140 of modified take-off output gear 100'. In this manner, torque is only transferred to power take-off output gear 100 through pinion shafts 64.

With particular reference now to FIG. 3, a third preferred embodiment of a power take-off arrangement is shown as incorporated in helical planetary gear reduction assembly 12. As will be appreciated, like numbers are used to designate like components herebefore described. In general, elongated sleeve bearing 106 is replaced with a bearing assembly 150 having its outer race 152 fixedly secured to non-splined surface 140 of take-off output gear 100'. An inner race 154 of bearing assembly 150 engages cylindrical surface 108 of clutch collar 44. Bearing assembly 150 is adapted to permit sliding axial movement of clutch collar 44 while concentrically supporting rotation of output gear 100' with respect to clutch collar 44.

As will be appreciated, each of the various disclosed embodiments provides a compact power take-off arrangement incorporated with rotatable planetary carrier assembly 58. The various bearing support devices are adapted to enable the output gear teeth 102 to absorb stresses while inhibiting excessive radial "floating" of carrier assembly 58 during power take-off mode operation. By virtue of each of the improved power take-off arrangements, virtually no eccentric loading is transferred to "bend" planet pinion gear shafts 64 thereby obviating the application of any unbalanced or "tipping" forces on the intermeshed components of gear reduction assembly 12. Thus, the present invention prevents excessive gear teeth wear or stress conditions, such as tight meshing, for example, developing between planet gear 68 during operation of transfer case 10 in its power take-off mode. It will be noted that carrier assembly 58 and, in turn, second carrier ring 62 always rotate in a fixed relation with respect to input shaft 24 because of the grounded annulus arrangement and the constant meshing of planet pinions 68 with sun gear 56 and annulus gear 82. Thus, as carrier assembly 58 is always rotating, a feature of the present invention is that power may be selectively transferred to power take-off input gear 126 with transfer case 10 in any one of its three operative positions, (i.e. high range, neutral, or low range) at a predetermined speed reduction relative to input shaft 24.

What is claimed is:

1. In a transfer case apparatus including an input shaft defining an integral sun gear, an output shaft having a clutch collar axially slidable thereon by means of clutch collar internal splines engaged with external splines on said output shaft, said input shaft having an axial counter-bore formed therein with internal clutch teeth formed in said input shaft counter-bore, external clutch teeth formed on said clutch collar slidably engageable with said input shaft counter-bore internal clutch teeth when said clutch collar is moved in a first direction from a neutral position to a high-range drive mode position, planetary gear reduction means including a carrier assembly having first and second carrier rings and shaft means for journally supporting a plurality of planet gears between said first and second carrier rings, said second carrier ring formed with an axial bore encircling said clutch collar, an annulus gear fixedly supported within said transfer case and having internal helical gear teeth in meshing engagement with said planetary gears, a power take-off output gear fixed to said second carrier ring and said shaft means for rotation with said carrier assembly and having external gear teeth extending a predetermined distance beyond said annulus gear, an aperture extending through said transfer case which is radially aligned with said power take-off output gear, mounting means for supporting a power take-off gearbox on said transfer case, said power take-off gearbox including an input gear coupled to a take-off shaft, a portion of said input gear adapted to extend through said aperture for meshingly engaging said output gear external gear teeth, said second carrier ring axial bore having internal gear teeth formed thereon adapted to engage said clutch collar external clutch teeth when said clutch collar is moved in a second direction from said neutral position to a low-range drive mode position, the improvement comprising bearing support means concentrically interposed between said clutch collar and a central axial bore formed in said output gear for journally supporting said output gear with respect to said clutch collar, said bearing support means adapted to inhibit unbalanced eccentric loading on said planetary gear reduction means upon said transfer case operating in a power take-off mode for delivery torque from said output gear to said input gear for driving said take-off shaft.

2. The transfer case of claim 1, wherein said support bearing means is an elongated sleeve bearing concentrically disposed between said clutch collar and the central bores of both of said second carrier ring and said take-off output gear, said elongated sleeve bearing journally supported for rotation relative to said clutch collar when said clutch collar is in said neutral and said high-range mode positions, said elongated sleeve bearing forming external spline means that are maintained in meshing engagement with said internal gear teeth of said second carrier ring whereby said elongated sleeve bearing is rotatably driven in response to rotation of said carrier assembly.

3. The transfer case of claim 2 wherein said take-off output gear further comprises internal gear teeth formed on said axial bore, said output gear internal gear teeth alignable with said internal gear teeth of said second carrier ring and maintained in meshing engagement with said external spline means formed on said elongated sleeve bearing.

4. The transfer case of claim 2 wherein a major diameter surface of said external spline means formed on said elongated sleeve bearing is adapted to radially support said take-off output gear such that drive torque is transferred from said shaft means to said take-off output gear.

5. The transfer case of claim 1 wherein said support bearing means includes a bearing assembly concentrically disposed between said central axial bore formed in said take-off output gear and an externally splined surface of said clutch collar, said bearing assembly adapted to journally support said take-off output gear with respect to said clutch collar while permitting axial sliding movement of said clutch collar relative thereto.

6. The transfer case of claim 5, wherein said bearing assembly is fixedly secured to said output gear within its central axial bore.

7. The transfer case of claim 1, wherein said carrier assembly constantly rotates at a predetermined speed reduction with respect to said input shaft, whereby said output gear is rotatably driven at a constant speed when said clutch collar is located in any of its high, low and neutral mode positions.

8. In a transfer case apparatus including a housing having an end wall defining an axial opening, said housing having outer wall means extending in a first axial direction from said end wall, first bearing means journally supporting an input shaft in said end wall opening, said input shaft having one end terminating within said housing in an annular end flange portion defining an integral sun gear, an output shaft journally supported in said housing, said output shaft having a clutch collar axially slidable thereon by means of collar internal splines engaged with external splines formed on said output shaft, said input shaft having an axial counter-bore formed on said input shaft annular end flange with internal clutch teeth formed therein, external clutch teeth formed on said clutch collar slidably engageable with said input shaft counter-bore internal clutch teeth when said clutch collar is moved axially in a first direction from a neutral position to a high-range direct drive mode position, a helical planetary gear reduction assembly including a carrier assembly having first and second carrier rings and a plurality of pinion shafts extending between said carrier rings for journally supporting a like plurality of planet gears therebetween, retainer means for retaining said carrier assembly in an axially aligned position on said input shaft, said outer wall means having means formed therein for supporting an annulus gear, said annulus gear having internal helical gear teeth in meshing relation with said planet gears, power take-off output gear means coupled to said second carrier ring and said pinion shafts, said output gear means having external peripheral gear teeth extending a predetermined distance beyond said annulus gear, said output gear means having an axial bore such that said output gear means concentrically surrounds said clutch collar, said outer wall means having an aperture therein that is radially aligned with said external gear teeth of said output gear means, mounting means located on said outer wall means for supporting a power take-off gearbox thereon, said power take-off gearbox including an input gear with external spur teeth splined for driven rotation on a take-off shaft, a portion of said input gear adapted to extend through said aperture for meshing engagement with said external gear teeth of said output gear means, said second carrier ring including an axial bore encircling said clutch collar and having internal spur gear teeth formed thereon such that when said clutch collar is moved axially in a second direction from said neutral position its external clutch teeth slidably engage said second carrier ring internal spur teeth for providing a low-range drive mode, the improvement comprising support means concentrically interposed between said clutch collar and said axial bore of said output gear means for journally supporting said output gear mean for relative rotation with respect to said clutch collar and said output shaft when said clutch collar is in said neutral and high-range mode positions, said support means adapted to inhibit unbalanced loading on said carrier assembly upon said transfer case operating in a power take-off mode whereby torque is delivered from said output gear means to drive said input gear.

9. The transfer case of claim 8, wherein said support means is an elongated sleeve bearing concentrically disposed between said clutch collar and the central axial bore of both of said second carrier ring and said take-off output gear means, said elongated sleeve bearing having external spline means that are maintained in meshing engagement with said internal gear teeth of said second carrier ring whereby said elongated sleeve bearing is rotatably driven in response to rotation of said carrier assembly.

10. The transfer case of claim 9 further comprising internal gear teeth formed on said axial bore of said output gear means, said output gear means internal gear teeth being alignable with said internal gear teeth of said second carrier ring and maintained in meshing engagement with said external spline means formed on said elongated sleeve bearing.

11. The transfer case of claim 9, wherein a major diameter surface of said external spline means formed on said elongated sleeve bearing is adapted to radially support said take-off output gear means axial bore such that drive torque is transferred from said pinion shafts to said take-off output gear means.

12. The transfer case of claim 8, wherein said support means includes an bearing assembly concentrically disposed between said central axial bore formed in said take-off output gear means and an external non-splined surface of said clutch collar, said bearing assembly adapted to journally support said take-off gear means with respect to said clutch collar while permitting axial sliding movement of said clutch collar relative thereto.

13. The transfer case of claim 8, wherein said carrier assembly constantly rotates at a predetermined speed reduction with respect to said input shaft, whereby said output gear means is rotatably driven at a constant speed when said clutch collar is located in any of its high, low and neutral mode positions.

14. In a transfer case apparatus including a housing having an end wall defining an opening, said housing having outer wall means extending in an inboard direction from said end wall, axial bearing means journally supporting an input shaft in said end wall opening, said input shaft having one end terminating within said housing in an annular end flange portion formed with external helical gear teeth defining an integral sun gear, an output shaft journally supported in said housing, said output shaft having a clutch collar axially slidable thereon by means of collar internal splines engaged with external splines on said output shaft, said input shaft having an axial counter-bore formed in said input shaft annular end flange, internal clutch teeth formed in said input shaft counter bore, external clutch teeth formed on said clutch collar slidably engageable with said input shaft counter bore internal teeth when said clutch collar is moved axially outboard from a neutral position into a high-range direct drive position, a helical planetary gear reduction assembly comprising a carrier having first and second carrier rings, said carrier rings supporting a set of planet pinion gears rotatably supported on a set of pins, the helical teeth of each said pinion gears in meshing engagement with said helical sun gear teeth and with internal helical teeth of an annulus gear concentrically disposed around said pinion gears, a power take-off output gear fixedly secured to an inboard side surface of said second carrier ring with said pins extending therethrough, said output gear having its outer periphery formed with external gear teeth, said second carrier ring having an internally splined central bore concentrically encircling said clutch collar, said second carrier ring internally splined bore adapted to be engaged by said clutch collar external splines upon said clutch collar being moved axially inboard from said neutral position to a low drive range position, said output gear formed with an axial bore encircling said clutch collar for defining an annular clearance therebetween, annular bearing means interposed in said annular clearance for concentrically positioning and supporting said output gear for rotation about said output shaft central axis, said housing outer wall means including an aperture radially aligned with said power takeoff output gear, mounting means formed on said outer wall means for supporting a power takeoff gearbox unit thereon including an input gear rotatably supported on an axially extending takeoff shaft disposed parallel to said transfer case input shaft, a portion of said input gear adapted to extend through said housing aperture for meshing engagement with said takeoff output gear external gear teeth, such that loading imposed on said output gear during power take-off operations are transferred to said annular bearing means, whereby upon shifting said clutch collar to any one of its high, neutral or low positions said carrier assembly is operative to transfer power at a constant relative speed to said power takeoff output gear for obviating unbalanced loading imposed on said planetary gear assembly upon operatively driving said power take-off gearbox unit.

15. The transfer case of claim 14, wherein said annular bearing means is an elongated sleeve bearing concentrically disposed between said clutch collar and the central axial bore of both of said second carrier ring and said take-off output gear, said elongated sleeve bearing journally supported for rotation relative to said clutch collar when said clutch collar is in said neutral and said high-range mode positions, said elongated sleeve bearing forming external spline means maintained in meshing engagement with said internal gear teeth of said second carrier ring whereby said elongated sleeve bearing is rotatably driven in response to rotation of said carrier assembly.

16. The transfer case of claim 15 further comprising internal gear teeth formed on said axial bore of said take-off output gear, said output gear internal gear teeth being alignable with said internal gear teeth of said second carrier ring and maintained in meshing engagement with said external spline means formed on said elongated sleeve bearing.

17. The transfer case of claim 15, wherein a major diameter surface of said external spline means formed on said elongated sleeve bearing is adapted to radially support said take-off output gear such that drive torque from said carrier assembly is transferred from said pins to said take-off output gear.

18. The transfer case of claim 14, wherein said annular bearing means includes an bearing assembly concentrically disposed between said central axial bore formed in said take-off output gear and an external non-splined surface of said clutch collar, said bearing assembly adapted to journally support said take-off output gear with respect to said clutch collar while permitting axial sliding movement of said clutch collar relative thereto.

19. The transfer case of claim 14, wherein said carrier assembly constantly rotates at a predetermined speed reduction with respect to said input shaft, whereby said output gear is rotatably driven at a constant speed when said clutch collar is located in any of its high, low and neutral positions.

* * * * *